Patented July 1, 1952

2,602,085

UNITED STATES PATENT OFFICE 2,602,085

METHOD OF PRODUCING CALCIUM SALTS OF SULFANILAMIDES

Simon L. Ruskin, New York, N. Y.

No Drawing. Application August 13, 1943, Serial No. 498,590

4 Claims. (Cl. 260—239.95)

The invention relates to the manufacture of metal compounds of sulfanilamides and more particularly to the metal compounds of sulfanilamide itself and of its N'-heterocyclic substitution products, and to an improved process for preparing the same.

It is the general object of the invention to prepare the alkali metal and non-alkali metal compounds of sulfanilamide and its N'-heterocyclic substitution products, the heterocyclic group containing both nitrogen and carbon, and in certain instances also sulfur, such compounds, both the soluble and the insoluble representatives, being useful in various forms as therapeutic agents, and particularly as bactericides and bacteriostats.

More specifically, it is an object of the invention to provide anhydrous metal compounds or salts of the type indicated, such anhydrous compounds being characterized by a high degree of stability on long storage.

It is also an object of the invention to provide water-soluble alkali metal, and particularly calcium, and also sodium salts of sulfanilamide, sulfapyridine, sulfathiazole, and sulfadiazine, which can be employed in various ways for the treatment of bacterial diseases, open wounds, etc.

A still further object of the invention is to provide an improved procedure for the manufacture of the compounds referred to under anhydrous conditions, whereby stable and highly pure preparations are obtained.

It is also an object of the invention to provide the soluble salts of sulfanilamide and of N'-heterocyclic derivatives thereof which can be administered intravenously or intramuscularly with a minimum of discomfort to the patient.

A further object of the invention is to provide salts of the type indicated which in aqueous solution have a pH value approaching neutrality. This is particularly true of the calcium sulfa salts whose pH range is from 8 to 9, whereas the sodium salts range from 9 to 10+. Thus, calcium sulfadiazine has a pH of 8, whereas the sodium sulfadiazine has a pH of 9.6. This is extremely important where mucous membranes and open wounds are to be treated. Calcium sulfathiazole with a pH of 8 is non-irritating to mucous membranes whereas sodium sulfathiazole with a pH of 9+ frequently shows a corrosive action on nasal mucous membranes. Thus, the calcium sulfa compounds possess a great advantage over sodium sulfa compounds.

Other objects and advantages of the invention will appear from the following more detailed description thereof.

In accordance with the present invention, there are prepared the alkali metal and non-alkali metal compounds of sulfanilamide and of its N'-heterocyclic substitution products by various double decompositions and in particular, by reactions conducted under anhydrous conditions. Thereby, there are obtained both water-soluble and water-insoluble products, both groups of which are useful in therapy, in a number of instances with markedly superior effects over known preparations. Thus, the soluble calcium salts of sulfanilamide, sulfathiazole, sulfapyridine, and sulfadiazine, greatly expand the field of intravenous sulfa-therapy, as thereby unusually high levels of sulfa drugs may be maintained for relatively long periods. These compounds, and especially the calcium compounds of sulfadiazine, are particularly useful in the treatment of bacterial endocarditis, wherein high levels of the sulfa drug are indicated. As an example of the utility of the insoluble metal derivatives, it may be mentioned that silver sulfathiazole is applicable in the form of a powder to open wounds, and can be employed for vaginal insufflation in cases of trichomonas. Other insoluble compounds can similarly be employed in the form of powders, and both the soluble and insoluble compounds can be topically applied in the form of creams and ointments, wherein they are suspended in suitable unguent bases. Certain of the insoluble compounds such as the bismuth, antimony, and other compounds of amphoteric metals and metalloids can be solubilized with sodium hydroxide, or with an organic base like an ethanolamine. The specific utility of other compounds will be described more in detail below.

In preparing the anhydrous compounds in accordance with the invention, the reactions are conducted in organic solvents like methyl and ethyl alcohols, glycerol, and in other organic liquids, in which one or more of the reagents is soluble. Thereby, products are obtained which are free of water of crystallization, and by reason of the absence of hydroxyl ions in the reaction medium, hydrolysis of the reaction products is prevented. The reactions in organic media is in many instances favored by the fact that advantage can be taken of the different solubilities of certain of the reaction products and by-products in the various media. Thus, reaction between calcium chloride and sodium sulfathiazole in hot methyl or ethyl alcohol is promoted by the fact that the sodium chloride formed by the reaction is insoluble in the alcohol, whereas the calcium sulfathiazole remains in solution, so that the reaction goes to completion and the calcium compound is readily separated in a relatively pure condition.

An advantageous procedure for producing certain of the compounds of the invention is by way of the methylate or ethylate of the metal which is reacted with the sulfa drug. In some instances, the hydroxide of the metal can be used. In these ways, the calcium compounds, for example, can be readily prepared, the reactions taking place in an absolute alcohol medium on the water bath. The calcium compounds so obtained are very soluble in water, which is quite surprising in view of the general insolubility of the calcium salts of insoluble compounds. In similar fashion, the sodium compounds may be prepared, by way of the sodium methylate in methyl alcohol. The products can be obtained in dry condition, either by concentrating the solutions and crystallizing, or by the addition of a miscible organic solvent like chloroform, in which the product is insoluble, or in any other suitable way. The yields are quite high, in many instances being practically quantitative. The reactants usually take place at room temperature but may be speeded by heating on the water bath.

The invention will be further described in the following examples which are presented purely by way of illustration:

EXAMPLE 1

*Preparation of calcium sulfathiazole*

16 g. finely divided calcium metal (0.4 mole) were refluxed with approximately 500 cc. absolute methyl alcohol until all of the gray calcium metal had turned to white calcium methoxide. The resulting suspension was then treated with 135 g. (0.54 mole) sulfathiazole and warmed on the water bath until practically complete solution had taken place. The excess calcium methylate was then filtered off and the resulting solution concentrated to about 250 cc., yielding a heavy syrup. The calcium sulfathiazole was precipitated by adding approximately 750 cc. chloroform under stirring. The product precipitated in an amorphous form, but after heating a short time on the water bath, it crystallized rapidly. It was filtered after standing on ice over night. Yield 120 g. or 80%. The product is hygroscopic and is soluble in its own weight of water or absolute methyl alcohol. The product has the probable formula.

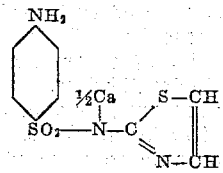

Analysis:
C=8.44% found
8.26% theory

EXAMPLE 2

*Preparation of calcium sulfapyridine*

26 g. (about 0.1 mole) sulfapyridine were suspended in 200 cc. hot absolute methyl alcohol. To this was slowly added a suspension of freshly made calcium methylate, prepared by refluxing 2 g. (0.05 mole) calcium with 100 cc. absolute methyl alcohol. On heating the reaction mixture on the water bath it began to clear up, but not completely. On the addition of 100 cc. more absolute methyl alcohol solution was complete. No precipitation took place on cooking. The reaction mixture was then concentrated at atmospheric pressure. To obtain a good yield the mixture was concentrated to a heavy syrup and then treated with excess chloroform. Yield 26 g. or 93%. The product is very soluble in water.

EXAMPLE 3

*Preparation of calcium sulfanilamide*

17.2 g. (0.1 mole) sulfanilamide were dissolved in 200 cc. boiling absolute methyl alcohol and treated with a suspension of freshly prepared calcium methylate made from 2 g. of calcium metal. Total volume of the reaction mixture was about 300 cc. It was boiled on the water bath under reflux for about one hour. At the end of this time the calcium methylate had completely disappeared with the formation of a flocculent precipitate of calcium sulfanilamide. After standing on ice over night the calcium sulfanilamide was filtered off and washed with a little chloroform. Yield 12 g. or 63%.

Analysis: Ca, 10.31% found; 9.95% theory.
S, 16.01% found; 16.70% theory.

A second crop is obtained by addition of excess chloroform to the filtrate.

By means of the soluble calcium salt, the arsenic, antimony, bismuth, tin and iron salts which are hydrolysed in the presence of hydroxyl ions were readily formed by double decomposition. The general method consists in dissolving or suspending the calcium sulfa drug in absolute methyl alcohol and slowly adding under heating and stirring an equivalent amount of a salt of the other metal, (preferably one whose corresponding calcium salt is soluble, such as the chloride) dissolved in hot absolute methyl alcohol. The reaction is usually rapid resulting in the precipitation of the sulfa compound of such other metal. The yields are practically quantitative and the $CaCl_2$, the only by-product, remains in solution. As the reaction medium is anhydrous, there is no hydrolysis, and there is eliminated any tendency to form metallic hydroxide as by-product. This reaction is superior to using the sodium salts in alcohol, as then there occurs partial alcoholysis with the formation of a mixture of metallic sulfa compound and heavy metal alcoholate.

EXAMPLE 4

*Preparation of antimony sulfathiazole*

7.2 g. (about 0.014 mole) calcium sulfathiazole were dissolved in 25 cc. absolute methyl alcohol and treated under stirring with 4.6 g. (0.02 mole) antimony trichloride. The reaction began to take place immediately with the formation of a light pink precipitate. After stirring approximately one hour, the precipitate was filtered off and washed with a little absolute alcohol. Yield 7.7 g. or practically 100%. The product is insoluble in water.

Analysis: Sb, 15.16% found; 15.28% theory.

The heavy metal salts of the sulfa compounds which are not hydrolysed in the presence of hydroxyl ions, which include chiefly the mercury, manganese and silver salts, are made by double decomposition in water at room temperature. The sodium salt of the sulfa compound is used, or the sulfa compound is put in solution with an equivalent of sodium hydroxide. An equivalent quantity of a water soluble heavy metal salt is added at room temperature under stirring. For this step $MnCl_2$, $HgCl_2$ or $AgNO_3$, etc. may be used. The reactions are instantaneous and quantitative. The heavy metal salt is insoluble in water and the sodium salt by-product is easily removed in the filtrate and by washing the precipitate with water.

EXAMPLE 5

*Preparation of silver sulfathiazole*

5.4 g. (0.02 mole) sodium sulfathiazole sesquihydrate were dissolved in 35 cc. water and treated under stirring at room temperature with 3.4 g. (0.02 mole) silver nitrate. A voluminous white precipitate was formed which was separated from the supernatant by centrifugation, washed twice with water by centrifugation and once with acetone. The acetone washings left no residue on drying showing that the product is insoluble in acetone and also that reaction was complete. Yield 6.6 g. or 100%.

EXAMPLE 6

*Preparation of manganese sulfathiazole*

13.6 g. (0.05 mole) sodium sulfathiazole sesquihydrate were dissolved in 50 cc. water and slowly treated under stirring with 5 g. (0.025 mole) manganese dichloride ($MnCl_2$, $4H_2O$) dissolved in 25 cc. water, at room temperature. A light salmon colored semi-solid precipitate was obtained which hardened on stirring. After standing in the ice chest over night, the precipitate was filtered off and washed with water and then with acetone. The yield was 12.5 g.

The product is insoluble in water but appears to be slightly soluble in acetone.

EXAMPLE 7

*Preparation of mercury sulfathiazole*

10.9 g. (0.04 mole) sodium sulfathiazole sesquihydrate were dissolved in 50 cc. water and slowly treated under stirring with 5.4 g. (0.02 mole) mercuric chloride dissolved in 100 cc. water. Addition was made at room temperature. Reaction was instantaneous with the formation of a white precipitate. As it did not filter well it was separated from the supernatant by centrifugation, washed twice with water by centrifugation and once with acetone. Yield quantitative. The product is insoluble in water.

EXAMPLE 8

*Preparation of sodium sulfanilamide*

17.2 g. (0.1 mole) sulfanilamide were dissolved in 100 cc. boiling absolute alcohol. To this was slowly added under stirring a solution of sodium methylate which was made by dissolving 2.3 g. (0.1 mole) sodium in 100 cc. absolute methyl alcohol. No crystallization took place on either heating or cooling. The reaction mixture was therefore concentrated to approximately 50 cc. and treated with an equal volume of chloroform. It was placed on ice over night and the precipitate was then filtered off. Yield 15.5 g. or 80%. A second crop was obtained by adding excess chloroform to the filtrate. The product is very soluble in water.

EXAMPLE 9

*Preparation of anhydrous sodium sulfathiazole*

22.3 g. (about 0.1 mole) sulfathiazole were added to a solution of sodium methylate which was made by dissolving 2.3 g. (0.1 mole) sodium in 100 cc. absolute methyl alcohol. On shaking a few minutes at room temperature, solution of the sulfathiazole was complete. On removal of approximately 80 cc. of methyl alcohol on the water bath, crystallization took place. The reaction mixture was then treated with excess chloroform and placed on ice over night. It was then filtered. Yield practically quantitative (24 g.).

EXAMPLE 10

*Preparation of sodium sulfapyridine*

26 g. (about 0.1 mole) sulfapyridine were added to a solution of sodium methylate which had been made by dissolving 2.3 g. (0.1 mole) sodium in 100 cc. absolute methyl alcohol. On shaking a few moments the entire reaction mixture crystallized to a solid cake. It was warmed a few moments on the water bath to complete the reaction and was then treated with excess chloroform and placed on ice over night. The precipitate was then filtered off. Yield practically quantitative (24 g.).

EXAMPLE 11

*Preparation of calcium sulfathiazole through the sodium compound*

35 g. sodium sulfathiazole sesquihydrate (0.1 mole) were dissolved in about 250 cc. absolute methyl alcohol at the boiling point. This was treated while warm with 5.5 g. (0.05 mole) calcium chloride dissolved in about 50 cc. hot methyl alcohol. A precipitate of sodium chloride formed which could be filtered off after warming the reaction mixture for a few moments. The filtrate was then inspissated on a water bath to a heavy syrup. On stirring this syrup with excess acetone a flocculent, white precipitate was obtained which was almost pure calcium sulfathiazole. Yield 20 g. (theory 25 g.).

EXAMPLE 12

*Preparation of tin sulfathiazole*

90 g. stannous chloride (0.4 mole) were dissolved in 1000 cc. absolute methyl alcohol. To this was added 89.2 g. (0.4 mole) sulfathiazole. The reaction mixture was heated on the water bath and another 200 cc. absolute methyl alcohol were added to complete solution. The methyl alcohol solution was then concentrated on the water bath to 150 cc. the methyl alcohol being removed by distillation at almost atmospheric pressure. The heavy syrup so obtained was then treated with 500 cc. chloroform. A crystalline precipitate was obtained which was allowed to settle over night before filtering. Yield 147 g.

Analysis: Cl, 23.8 found; Sn, 16.54 found; S, 16.57 found.

The above analysis corresponds to the following probable formula:

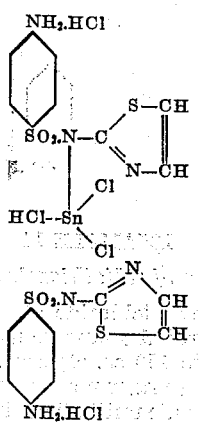

The theoretical analysis of the above compound is Cl, 23.93%; Sn, 16.05%; S, 17.26%.

When suspended in water this compound gives a very acid reaction. A neutral compound may be obtained by dissolving 75 g. (1/10 mole) of this hydrochloride in an equal weight of absolute methyl alcohol and adding monoethanol amine until exact neutrality is obtained. Approximately 15 cc. are required or slightly less than 1/10 mole. A white precipitate was obtained which was filtered by suction and washed with methyl alcohol. Yield 40 g.

Sn, 31.0% found; 31.6% theory.

The compound was found to contain chlorine, and the analysis indicates the following structure:

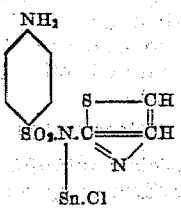

EXAMPLE 13

*Preparation of sulfathiazole bismuthate*

150 cc. bismuth nitrate solution containing 48.5 g. (0.1 mole) Bi(NO$_3$)$_3$·5H$_2$O and 50 cc. glycerol were diluted with 600 cc. 50% glycerol. This solution was then treated under mechanical stirring with N.NaOH until all the bismuth was first precipitated as bismuth hydroxide and then re-dissolved as sodium bismuthate. Approximately 450 cc. N.NaOH are necessary. The reaction is as follows:

$$Bi(NO_3)_3 + 3NaOH \rightarrow Bi(OH)_3 + 3NaNO_3$$
$$Bi(OH)_3 + NaOH \rightarrow NaBiO_2 + 2H_2O$$

To this clear solution are then added under stirring 35 g. (0.1 mole) solid sodium sulfathiazole sesquihydrate. The solution continues to remain clear. It is then brought to neutrality by slowly adding under stirring 200–250 cc. N hydrochloric acid. A pale pink precipitate is obtained which is sulfathiazole bismuthate. It may be separated by centrifugation and washed three times with water by centrifugation. It was then dried in vacuo around 50° C. Yield 40 g. or 90%.

The probable formula is:

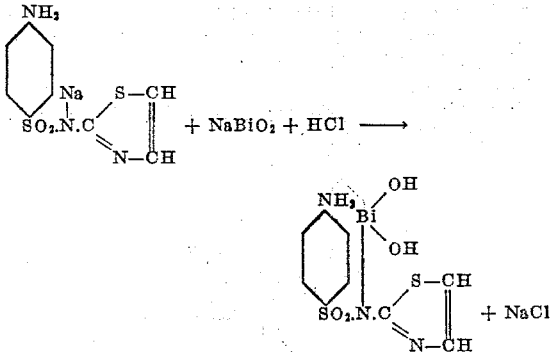

EXAMPLE 14

*Preparation of sulfathiazole antimonite*

23 g. antimony trichloride (0.1 mole) dissolved in 150 cc. saturated saline solution were added under stirring to 150 cc. glycerol. This solution was then treated under mechanical stirring with N sodium hydroxide until all of the antimony was first precipitated as the hydroxide, and then re-dissolved as sodium antimonite. Approximately 400 cc. are necessary, which is the theoretical amount.

To this clear solution are then added under stirring 35 g. (about 0.1 mole) solid sodium sulfathiazole sesquihydrate. The solution continued to remain clear. It was then brought to neutrality by slowly adding under stirring 200 cc. N hydrochloric acid. A pale pink voluminous precipitate was obtained, which was separated by centrifugation and washed three times with water by centrifugation. It was dried in vacuo around 50° C. Yield 30 g. or 85%. The probable formula is:

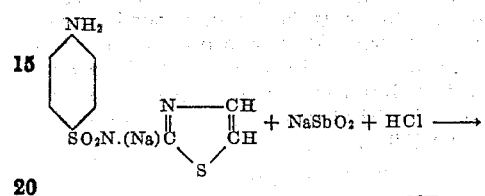

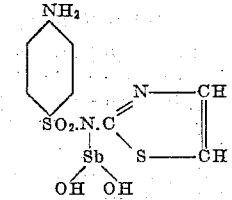

EXAMPLE 15

*Preparation of sulfathiazole stannite*

200 cc. stannous chloride solution containing 22.6 g. SnCl$_2$·2H$_2$O (0.1 mole) and 100 cc. glycerol were slowly treated under stirring with normal sodium hydroxide until the tin was first precipitated as stannous hydroxide and then re-dissolved as sodium stannite. 300 cc. normal sodium hydroxide were used which is the theoretical amount. The reaction is as follows:

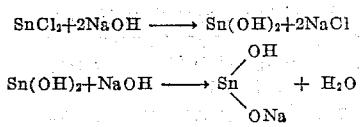

To this clear solution was then added under stirring 35 g. (about 0.1 mole) solid sodium sulfathiazole sesquihydrate. The solution continued to remain clear, but became bright yellow. It was brought to neutrality by slowly adding under stirring 200 cc. normal hydrochloric acid. A bright lemon yellow precipitate was obtained which is sulfathiazole stannite. Yield 30 g. or 85%. The product was separated by centrifugation and washed with water three times by centrifugation. The reaction is as follows:

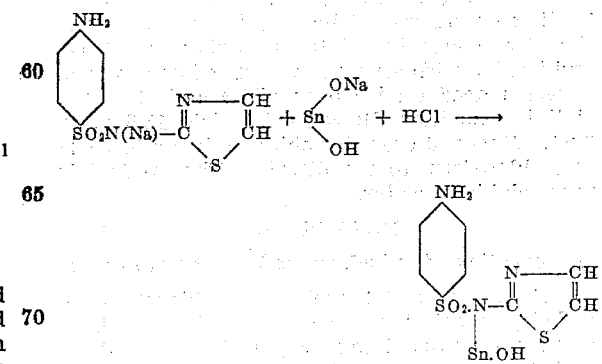

As already indicated, certain of the insoluble products, like the bismuth, antimony, arsenic, and tin compounds, while they may be employed as powders or in ointments, can be brought into solution in an alkaline medium; in such cases it is preferable to keep the pH value as close to neutrality as possible.

In each of the above described compounds, except perhaps the sodium compounds, there is present a metal which itself has certain therapeutic activity; and I consider as falling within the scope of the present invention, as defined in the appended claims, the sulfa compounds of all metals which themselves contribute some therapeutic action to the product as a whole.

I have found that in the case of the calcium salts of sulfanilamide, sulfapyridine, sulfathiazole and sulfadiazine, the calcium exerts a certain detoxicating action. The calcium salts, by reason of their water-solubility, are eminently suitable for the irrigation treatment of open wounds, a 1 to 3 per cent aqueous solution being satisfactory for this purpose. The calcium compounds are generally preferred because of their lower degree of alkalinity than the corresponding sodium compounds. Of particular utility is calcium sulfathiazole which, because of its very gentle action on sensitive tissues, has been employed by me in 3 to 5 per cent aqueous solution for a nasal spray. Sodium sulfathiazole is not as satisfactory for this purpose because it is very irritating by reason of its high alkalinity, and even causes sloughing in the nasal mucosa. The calcium salt, on the other hand, causes no damage to the delicate membranes, and is easily absorbed, and I have found it to be very effective for the treatment of sinus infections. The calcium salt is superior to the sodium salt also on oral administration as, unlike the sodium salt, it is not irritating to the stomach.

The calcium salts have in general a pH value which is at least a full point lower than that of the corresponding sodium salt in equivalent concentration; thus, whereas the sodium salt solutions generally have a pH value of about 9 to 10.5, that of the corresponding salts is about 8 to 9.

The bismuth compounds, especially the bismuth compound of sulfathiazole, are highly effective agents for the treatment of gonorrhea. They have the advantage that they will protect not only against gonorrheal, but simultaneously also against luetic infection. Persons who have been subjected to gonorrheal infections have generally been exposed at the same time to luetic infection. However, evidence of gonorrheal infection appears in a few days, but lues does not become apparent for about forty days. Hence a bactericide which will guard against and overcome both gonorrheal and luetic infection is of great value both in therapy and prophylaxis.

The bismuth compounds may be taken by mouth, either in their relatively insoluble condition or after solubilization with sodium hydroxide or the like. The relatively insoluble compound is probably solubilized at least partially under the alkaline conditions prevailing in the intestinal tract.

The tin compounds represent exceptionally effective agents for the treatment of staphylococcal infection. The antistaphylococcal action of tin has long been known, but the application of tin compounds to human therapy has presented many difficulties. Up to the present time only tin itself and tin oxide have been available for use, and they have been administered as the insoluble metal and metal oxide by mouth for the treatment of staphylococcal abscesses. The local use of tin salts has been practically impossible because of the tendency to hydrolysis with the formation of strongly acidic compounds which were too irritating on the tissues. The tin compounds of sulfanilamide and $N^1$-heterocyclic substitution products thereof, and especially of sulfathiazole have a markedly increased antistaphylococcal action over sulfathiazole itself for local use in the treatment of abscesses. In the tin compounds of the present invention, the tendency to hydrolysis is removed or eliminated by the removal of the hydrochloric acid by the treatment with, for example, monoethanolamine, as above described. The tin sulfathiazole so obtained is close to neutral in its reaction, is non-irritating to the tissues, and forms with creams or unguent bases a remarkably effective ointment for the treatment of staphylococcal infections.

The manganese compounds have an increased bactericidal action, and the same applies to the mercury and antimony compounds. The dosage for this and the other compounds described above, when administered parenterally or perorally, is approximately the same as for the corresponding sulfanilamides themselves. Thus, in the case of bismuth sulfathiazole, the peroral dosage is 4 to 7 grams every four hours, taken in the form of tablets.

In the case of the heterocyclic derivatives, the 2-compounds, for example, the 2-thiazole and 2-diazine amides are preferred, but the isomers may likewise be used. The corresponding compounds of thiodiazole are also active bactericidal agents. The heterocyclic groups may be otherwise unsubstituted, or they may be further substituted, for example, by hydrocarbon radicals like methyl, ethyl, benzyl, phenyl, etc., and by methoxy, ethoxy, and other alkoxy groups.

I claim:

1. Process for the manufacture of calcium salts of sulfanilamides, which comprises reacting a p-amino benzene sulfonamide having a free hydrogen attached to the N of the sulfonamide group with the calcium compound of a lower aliphatic alcohol under anhydrous conditions, whereby the calcium replaces the free hydrogen.

2. Process for the manufacture of calcium sulfanilamides, of the general formula $$NH_2.C_6H_4.SO_2.N(\tfrac{1}{2}Ca).X$$

wherein X is a heterocyclic radical containing nitrogen and carbon and joined to the N of the sulfonamide group through one of its carbon atoms, which comprises reacting a suspension of the sulfanilamide with the calcium compound of a lower aliphatic alcohol under anhydrous conditions, and thereafter separating the calcium compound of the substituted sulfanilamide.

3. Process for the manufacture of calcium sulfathiazole, which comprises reacting calcium methoxide with sulfathiazole in an anhydrous medium in which calcium sulfathiazole is at least moderately soluble, and thereafter precipitating the calcium sulfathiazole from solution by adding an anhydrous organic solvent in which it is insoluble but which is miscible with the reaction medium.

4. Process according to claim 3, wherein the reaction medium is anhydrous ethyl alcohol and wherein the miscible solvent is chloroform.

SIMON L. RUSKIN.

(References on following page)

REFERENCES CITED

The following references are of record in the file of this patent:

UNITED STATES PATENTS

| Number | Name | Date |
|---|---|---|
| 1,777,173 | Lubrecht | Sept. 30, 1930 |
| 2,133,787 | Northey | Oct. 18, 1938 |
| 2,135,553 | Andersen | Nov. 8, 1938 |
| 2,229,992 | Schmidt | Jan. 28, 1941 |
| 2,295,867 | Roblin | Sept. 15, 1942 |
| 2,300,676 | Kharasch | Nov. 3, 1942 |
| 2,303,698 | Kharasch | Dec. 1, 1942 |
| 2,305,260 | Kamlet | Dec. 15, 1942 |
| 2,324,014 | Moore | July 13, 1943 |

FOREIGN PATENTS

| Number | Country | Date |
|---|---|---|
| 849,504 | France | Aug. 21, 1939 |
| 111,230 | Australia | Aug. 22, 1940 |
| 213,815 | Switzerland | June 3, 1941 |
| 114,894 | Australia | Apr. 2, 1942 |
| 114,821 | Australia | May 21, 1942 |

OTHER REFERENCES

Science, Dec. 23, 1938, pp. 597–599.
J. Am. Chem. Soc., Dec. 1941, p. 3523.
J. Am. Chem. Soc., Dec. 1939, p. 3593.
J. Am. Chem. Soc., Aug. 1940, pp. 2002–2005.
J. Am. Chem. Soc., Oct. 1941, pp. 2739–2740.
J. Am. Med. Assoc. 119, p. 1201, (Aug. 8, 1942).